(12) United States Patent
Kumaran et al.

(10) Patent No.: US 7,136,352 B2
(45) Date of Patent: Nov. 14, 2006

(54) METHOD AND APPARATUS FOR PROCESSING OF REGULATED CONNECTIONS IN A COMMUNICATION NETWORK

(75) Inventors: Krishnan Kumaran, Scotch Plains, NJ (US); Michel Mandjes, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 943 days.

(21) Appl. No.: 09/999,302

(22) Filed: Oct. 31, 2001

(65) Prior Publication Data

US 2002/0097716 A1 Jul. 25, 2002

Related U.S. Application Data

(60) Provisional application No. 60/244,956, filed on Nov. 1, 2000.

(51) Int. Cl.
*H04L 12/56* (2006.01)

(52) U.S. Cl. .................................. 370/230; 370/395.2

(58) Field of Classification Search ........ 709/230–244; 370/229–238, 412–415, 395.21, 395.2, 395.41–395.43, 370/389

See application file for complete search history.

(56) References Cited

U.S. PATENT DOCUMENTS

| | | | |
|---|---|---|---|
| 5,838,663 A | | 11/1998 | Elwalid et al. |
| 6,046,981 A * | | 4/2000 | Ramamurthy et al. ...... 370/232 |
| 6,222,824 B1 * | | 4/2001 | Marin et al. ................. 370/230 |
| 6,314,085 B1 * | | 11/2001 | Saranka ....................... 370/230 |
| 6,856,946 B1 * | | 2/2005 | Dathe et al. ................. 702/189 |
| 6,907,467 B1 * | | 6/2005 | Venemans ................... 709/234 |
| 2002/0163887 A1 * | | 11/2002 | Suni ............................ 370/232 |

OTHER PUBLICATIONS

Francesco Lo Presti et al, "Source time Scale and Optimal Buffer/Bandwidth Tradeoff for Heterogeneous Regulated Traffic in a Network Node", Aug. 1999, IEEE, pp. 490-501.*
Suk-Gwon Chang, "Fair Integration of Routing and Flow Control in Communication Networks", Apr. 1992, IEEE, pp. 821-834.*
U.S. Appl. No. 09/393,949, filed Sep. 10, 1999, K. Ramanan et al., "Method and Apparatus for Scheduling Traffic to Meet Quality of Service Requirements in a Communication Network."
L. Georgiadis et al., "Optimal Multiplexing on a Single Link: Delay and Buffer Requirements," IEEE Transactions on Information Theory, 43(5):1518-1535, 1997.

(Continued)

*Primary Examiner*—Hassan Kizou
*Assistant Examiner*—Habte Mered

(57) ABSTRACT

Techniques are disclosed for controlling the transmission of packets over a communication link in a network. The invention in accordance with one aspect thereof determines a number of packet transmission connections supportable for a given buffer size in a node of the network while maintaining one or more specified quality of service requirements for packet transmission. This determination in the case of homogeneous input sources utilizes a combined approximation of a maximum number of supportable connections for a range of buffer sizes, the combined approximation being generated as a combination of a first approximation for small buffer sizes and a second approximation for large buffer sizes. The invention can also be used to determine an optimal operating point on a buffer-capacity tradeoff curve for each of a number of different types of heterogenous input sources. Data packets from multiple input sources may be admitted to the node of the network, or otherwise processed within the node, based at least in part on the determined number of supportable connections.

18 Claims, 6 Drawing Sheets

OTHER PUBLICATIONS

J. Liebeherr et al., "Exact Admission Control for Networks with a Bounded Delay Service," IEEE/ACM Transactions on Networking, 4(6):885-901, 1996.

M. Andrews et al.,"Minimizing End-to-End Delay in High-Speed Networks with a Simple Coordinated Schedule," IEEE INFOCOM'99, pp. 380-388, 1999.

A. Birman et al., "An Optimal Service Policy for Buffer Systems," Journal of the Association Computing Machinery (JACM), vol. 42, No. 3, pp. 1-26, 1995.

H.R. Gail et al., "Buffer Size Requirements Under Longest Queue First," Performance Evaluation, vol. 18, pp. 1-13, 1993.

A. Elwalid et al., "Design of Generalized Processor Sharing Schedulers which Statistically Multiplex Heterogeneous QoS Classes," Proc. of IEEE INFOCOM'99, pp. 1-35, Mar. 1999.

A. Elwalid et al., "A New Approach for Allocating Buffers and Bandwidth to Heterogenous, Regulated Traffic in an ATM Node," IEEE Journal on Selected Areas in Communications, vol. 13, No. 6, pp. 1115-1127, Aug. 1995.

* cited by examiner

L=1e-9, C=150 Mb/s, p=0.3 Mb/s, r=0.15 Mb/s, T=353 ms

- BROWNIAN BRIDGE (BB) ———
- EXACT – – – –
- EMW — · —
- SMALL BUFFER APPROX. (SMALLBUF) — · —
- CONCAVE ENVELOPE OF BB AND SMALLBUF — — —

L=1e-9, C=150 Mb/s, p=1.5 Mb/s, r=0.15 Mb/s, T=70.7 ms

L=1e-9, C=150 Mb/s, p=6 Mb/s, r=0.15 Mb/s, T=1.77 ms

L=1e-9, C=150 Mb/s, p=20 Mb/s, r=0.15 Mb/s, T=0.53 ms

METHOD AND APPARATUS FOR PROCESSING OF REGULATED CONNECTIONS IN A COMMUNICATION NETWORK

PRIORITY CLAIM

The present application claims the priority of U.S. Provisional Application No. 60/244,956, filed Nov. 1, 2000 in the name of inventors K. Kumaran and M. Mandjes and entitled "Admission Control for Regulated Connections in a Communication Network," which is incorporated by reference herein.

FIELD OF THE INVENTION

The present invention relates generally to communication networks, and more specifically to admission control and scheduling techniques for controlling the transfer of data through such networks.

BACKGROUND OF THE INVENTION

A very important and challenging problem in the design of high-speed communication networks is that of providing Quality of Service (QoS) guarantees, usually specified in terms of loss probabilities or packet delays in the network. For example, the control of packet delays is often of crucial importance, particularly for real-time applications such as video delivery systems, wireless networks, multimedia networks, call centers, etc. A basic decision that has to be made in such contexts is that of connection admission control, i.e., one has to determine when a new user can be admitted to the system, while still fulfilling the QoS requirements of all users already in the system. Moreover, users already in the system have to be scheduled in the most efficient manner so as to maximize the number of users that can be admitted.

Exemplary admission control and scheduling techniques are disclosed in U.S. Pat. No. 5,838,663, issued Nov. 17, 1998 in the name of inventors A. Elwalid, D. Mitra and R. H. Wentworth and entitled "Method for Admission Control and Routing by Allocating Network Resources in Network Nodes," which is incorporated by reference herein. For example, this patent discloses a technique that may be utilized in an admission control element of a router, switch or other network processing element to determine the maximum number of connections that can be admitted, for a given buffer size, without introducing undue amounts of loss or delay in the network traffic. However, in certain circumstances it is possible that this technique may substantially underestimate the maximum number of admissible connections, e.g., in the case of large buffer sizes. A need therefore exists for improved techniques which can provide a better estimate of the maximum number of admissible connections.

In addition, with regard to the problem of resource allocation, it is well known that there is a tradeoff between bandwidth and buffer space. More particularly, an input that is fed to a network link having unlimited bandwidth capacity requires zero buffer space and vice versa. However, conventional techniques have been unable to determine in an efficient manner the optimum tradeoff between bandwidth and buffer space. It would therefore also be desirable if improved techniques were available for determining this tradeoff. Such techniques could be used, for example, in network configuration, in the above-noted admission control, as well as in the scheduling of users already admitted to a network.

SUMMARY OF THE INVENTION

The invention provides improved techniques for controlling the transmission of packets over a communication link in a network.

In an illustrative embodiment, data packets from multiple input sources are admitted to or otherwise processed in a node of the network based at least in part on a determined number of supportable connections N. The multiple input sources may be modeled as deterministic on-off sources subject to dual leaky bucket regulation, such that a given source has associated therewith a peak rate p, a mean rate r and a maximum burst period T. The multiple sources may comprise homogeneous sources, each having the same peak rate p, mean rate r and maximum burst period T. The multiple sources may alternatively comprise heterogeneous sources of different types i, i=1, 2, ... K, wherein a given source of type i has peak rate $p_i$, mean rate $r_i$, and maximum burst period $T_i$, and $N_i$ denotes the number of sources of type i.

In accordance with one aspect of the invention, a determination is made regarding the number of supportable connections N, for a given buffer size in a node of the network, that will permit maintenance of one or more specified quality of service requirements for packet transmission. This determination in the case of homogeneous input sources utilizes a combined approximation of the maximum number of supportable connections for a range of buffer sizes, the combined approximation being generated as a combination of a first approximation for small buffer sizes and a second approximation for large buffer sizes. The first approximation may be a square root approximation configured to reflect positive correlations between the multiple sources, while the second approximation may be a Brownian bridge approximation configured to reflect negative correlations between the multiple sources. The combined approximation may be a concave curve combination of first and second curves corresponding to the respective first and second approximations.

In accordance with another aspect of the invention, an optimal operating point on a buffer-capacity tradeoff curve is determined for each of a number of different types of heterogenous input sources. The tradeoff curve specifies the variation in the buffer size as a function of the capacity of a link over which the packet transmission connections are made, and the operating point designates the given buffer size and corresponding capacity for a particular number of connections. The determination of the optimal operating point may involve partitioning a buffer size B and link capacity C into ($B_i$, $C_i$) for the i different types of sources in conjunction with maximizing N for a given connection mix vector.

In accordance with yet another aspect of the invention, the optimal operating point may be determined in accordance with a proportional control algorithm. For example, the proportional control algorithm may reduce a multiplier λ if an actual buffer utilization is higher than an actual bandwidth utilization, by an amount proportional to the absolute difference in the utilizations, and increase λ if an actual buffer utilization is lower than an actual bandwidth utilization, also by an amount proportional to the absolute difference in the utilizations. As a result, the proportional control algorithm converges at the optimal operating point without requiring explicit determination of an admissible region.

The techniques of the present invention may be implemented at least in part in the form of one or more software programs running on a router, switch or other type of programmable network processing element.

DETAILED DESCRIPTION OF THE INVENTION

The present invention will be illustrated below in conjunction with exemplary scheduling techniques implemented in a node of a communication network. It should be understood, however, that the invention is not limited to use with any particular type of communication network device or network configuration. The disclosed techniques are suitable for use with a wide variety of other systems and in numerous alternative applications. A given network node may correspond, by way of example and without limitation, to a router, switch or other network processing element. The term "node" as used herein should therefore be understood to encompass any network processing element capable of utilizing one or more of the techniques of the invention.

Figure 1:
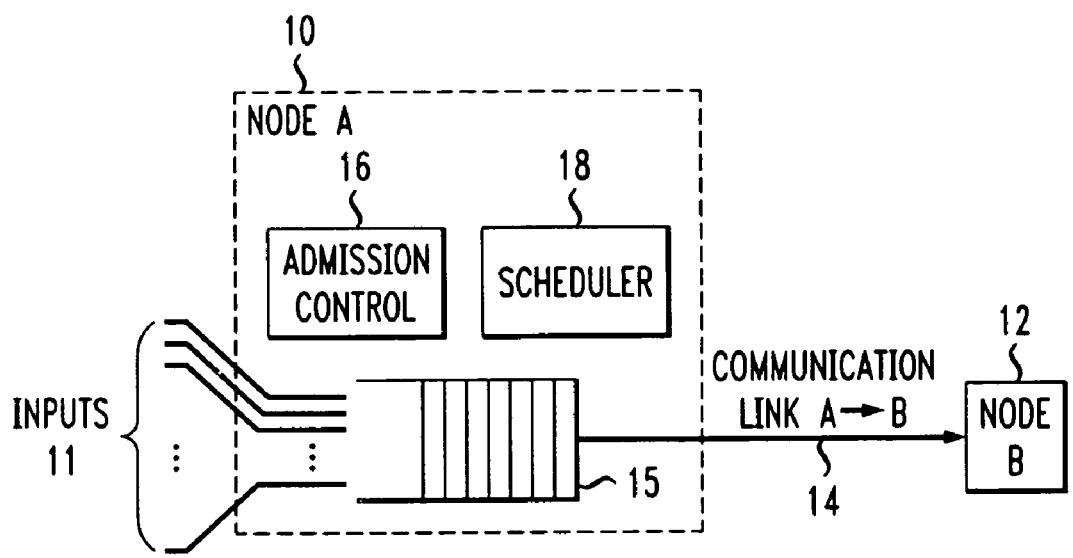
FIG. 1 shows an illustrative embodiment of the invention as implemented in a portion of a communication network.

FIG. 1 shows an illustrative embodiment of the invention as implemented in a node 10 of a communication network. The node 10, also referred to as node A, receives a set of input data flows 11 from, e.g., other nodes or information sources of the network. Each of the inputs 11 may correspond to a particular user or other input data source for which quality of service (QoS) guarantees are to be provided, e.g., in terms of a designated loss probability or packet delay. The node 10 communicates with another node 12, also referred to as node B, via an A→B communication link 14. The nodes 10, 12 and communication link 14 represent portions of the communication network, e.g., nodes 10, 12 may represent computers or other types of digital data processing devices, and link 14 may represent a packet-based transmission medium over which the nodes communicate.

The term "packet" as used herein is intended to include any grouping or other arrangement of data suitable for transmission over a communication network link. A given "packet" in accordance with this definition may therefore include only a single bit, but more typically will include multiple bits arranged in accordance with a specified packet format.

The node 10 includes a buffer 15 that receives packets associated with the inputs 11. Although only a single buffer is shown in this example, it will be appreciated by those skilled in the art that the node may include multiple such buffers. Also associated with the node 10 is an admission control element 16 and a scheduler 18. The admission control element 16 controls the admission of connections within the node 10, e.g., determines which of the inputs 11 are permitted to deliver packets into the buffer 15, while the scheduler 18 retrieves packets from the buffer 15 for transmission over the link 14 in accordance with a specified scheduling policy. One or both of the elements 16 and 18 operate in accordance with the techniques of the invention, to be described in greater detail below, but these elements may otherwise be configured in a well-known conventional manner. For example, such elements may be implemented using one or more software programs stored in a memory of the node and executed by a processor of the node, as will be illustrated in conjunction with FIG. 2.

Figure 2:
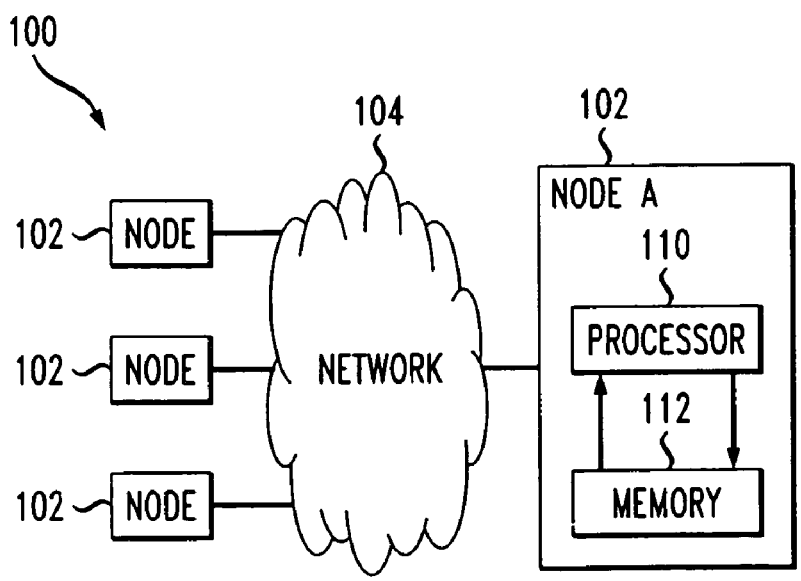
FIG. 2 is a block diagram of an exemplary communication network in which the invention may be implemented.

FIG. 2 shows a portion of an exemplary communication system 100 which includes the above-described nodes, as well as other nodes. More particularly, the system 100 includes a plurality of nodes 102 which communicate over a network 104. The network 104 may itself be comprised of multiple interconnected nodes, and may represent, e.g., the Internet, a wireless network, a local area network, a wide area network, an intranet, an extranet, a telephone, cable or satellite network, as well as combinations or portions of these and other networks. A given one of the nodes 102, denoted node A, corresponds generally to node A, i.e., node 10, of the FIG. 1 configuration. Node A in this example includes a processor 110 and a memory 112.

The processor 110 may represent, e.g., a microprocessor, a computer, a central processing unit (CPU), an application-specific integrated circuit (ASIC), as well as portions or combinations of these and other suitable processing devices. The memory 112 may represent, e.g., an electronic memory, a magnetic or optical disk-based memory, as well as portions or combinations of these and other memory devices. For example, the memory 112 may represent a memory associated on a common integrated circuit with the processor 110, or a separate electronic memory integrated with the processor 110 into a computer or other device, and may be used to implement the buffer 15 of FIG. 1. As indicated previously, the admission control element 16 and scheduler 18 of FIG. 1 may be implemented in whole or in part in the form of one or more software programs stored in the memory 112 and executed by the processor 110.

The present invention provides techniques for determining an appropriate number of sources that may be admitted by a given network node, such as node 10 described in conjunction with FIG. 1, while maintaining a designated loss probability or other QoS criteria, and also for determining an optimal tradeoff between the capacity or bandwidth C of the outgoing link and the maximum buffer size B of a given network node.

The invention will be illustrated using an example model in which the inputs 11 of FIG. 1 are assumed without limitation to comprise deterministic on-off sources. As will be described in greater detail below, multiple deterministic on-off sources generally exhibit positive correlation on short time scales and negative correlation on larger time scales. It should be emphasized that the particular model used to illustrate the invention is not itself a requirement of the invention.

The data traffic from the deterministic on-off sources is assumed to be regulated, i.e., subject to admission control, in accordance with a well-known dual leaky bucket (DLB) technique. This technique specifies the following three parameters for a given source: a peak rate p, a maximum average or sustainable rate r (also referred to herein as the mean rate), and a maximum allowed burst period or on-time T (which is defined as the maximum time that the source is allowed to send consecutively at the peak rate p).

The sources may be heterogenous, i.e., of different types i, i=1, 2, . . . K. A given source of type i has mean rate $r_i$, peak rate $p_i$ and on-time $T_i$, and $N_i$ denotes the number of sources of type i. The total number of sources is given by N, where $$N = \sum_{i=1}^{K} N_i.$$

In the case of homogeneous traffic, all of the sources have the same traffic descriptor (r, p, T), and the resources B and C can be rescaled by the number of inputs N as follows:

B=Nb and C=Nc.

It should be understood that the above-noted deterministic on-off source assumption, and any other assumptions made herein, are for purposes of illustration only, and should not be construed as limiting the scope of the invention in any way. Alternative embodiments of the invention may be configured in which one or more of the described assumptions do not apply.

In general, the invention in the illustrative embodiment involves determining the probability of the actual buffer content exceeding the maximum buffer size B, this probability being denoted herein as L(B, C), or, equivalently, the probability that packet delay D exceeds B/C. For further simplification of the description, it will be assumed that $\Sigma_i N_i r_i < C < \Sigma_i N_i p_i$, which excludes certain trivial situations.

With regard to the above-noted case of homogeneous traffic, we have determined that the loss curve, i.e., the decay rate of the loss probability as a function of b, is convex at a specific b, if the packet arrivals are negatively correlated on a time scale related to overflow. Conversely, the loss curve is concave at a specific b, if the packet arrivals are positively correlated on the time scale related to overflow.

As noted above, deterministic on-off sources exhibit positive correlation on short time scales and negative correlation on larger time scales. These correlations can be visualized by examining the variance of the traffic A(t). As a preliminary matter, the distribution of A(t) can be made explicit as follows. The period of the source is denoted by S:=T+T'. We assume that T<T', but an analogous reasoning applies to the case that T≧T'. Because an epoch U of the start of the burst is uniformly distributed on the interval [0, S], the following three cases can be distinguished:

1.

$$t < T \cdot \ X(t) = \begin{cases} t-U & U\epsilon[0,t] \\ 0 & U\epsilon[t,T'] \\ U-T' & U\epsilon[T',t+T'] \\ t & U\epsilon[t+T',S] \end{cases}$$

2.

$$T \leq t < T' \cdot \ X(t) = \begin{cases} T & U\epsilon[0,t-T] \\ t-U & U\epsilon[t-T,t] \\ 0 & U\epsilon[t,T'] \\ U-T' & U\epsilon[T',S] \end{cases}$$

3.

$$t \geq T' \cdot X(t) = \begin{cases} T & U\epsilon[0,t-T] \\ t-U & U\epsilon[t-T,T'] \\ T-T' & U\epsilon[T',t] \\ U-T' & U\epsilon[t,S] \end{cases}$$

One can then calculate the variance $\sigma^2(t):=p^2 \text{Var} X(t)$, where VarX(t) is given by:

$$\text{Var}X(t) = \begin{cases} -\frac{t^3}{3S} + \frac{Tt^2}{S} - \frac{T^2 t^2}{S^2}, & t\epsilon[0,T) \\ -\frac{T^3}{3S} + \frac{T^2 t}{S} - \frac{T^2 t^2}{S^2}, & t\epsilon[T,T') \\ -\frac{T^3}{3S} + \frac{T^2 t}{S} + \frac{(t-T')^3}{3S} - \frac{T^2 t^2}{S^2}, & t\epsilon[T',S) \end{cases}$$

Between 0 and S, a plot of the variance $\sigma^2(t)$ is first convex, then concave, and finally convex again. It should be noted that concavity indicates negative correlations, and, conversely, convexity indicates positive correlations.

The first part of the above-noted loss curve is concave, due to the positive correlations on the short time scale, whereas the second part will be convex, because of the negative correlations on the somewhat longer time scale. The present invention provides specific approximations for both of these parts of the loss curve, and a combined approximation which provides a good fit for a variety of different types of traffic over both large and small buffer sizes. For small values of b, we will use a "square root" small buffer approximation, to be described below, in which the positive correlations are exploited. For larger values of b we will use an approximation, also to be described below, based on the well-known Brownian bridge, which naturally incorporates the negative correlations. The combined approximation is formed as a concave curve combination of the small and large buffer approximations.

Small Buffers, Homogeneous Traffic

In this case, the positive correlations between the input traffic sources are dominant. This observation is utilized in this section to specify an expression defining the maximum number of sources to be admitted, e.g., in the form of a defined admissible region.

A. Approximation

First define $$\alpha(c) := \frac{c}{p} \log\left(\frac{c}{r}\right) + \left(1 - \frac{c}{p}\right) \log\left(\frac{p-c}{p-r}\right),$$

and

-continued $$\beta(c) := \frac{2}{p}\sqrt{\left(\frac{c}{T} + \frac{p-c}{T'}\right)\log\left(\frac{c}{p-c}\cdot\frac{T'}{T}\right) - 2\left(\frac{c}{T} - \frac{p-c}{T'}\right)}.$$

It can be shown that the amount of traffic $I(b)$ generated by a single one of the homogeneous sources increases rapidly for small b as $\sqrt{b}$:

$$-I(b) = \lim_{N\to\infty}\frac{1}{N}\log L_N(b,c) = -\alpha(c) - \beta(c)\sqrt{b} + O(b).$$

Notice that this formula reflects the positive correlations: $I(b)$ is concave for small b. This leads to the loss approximation $$L(B,C) \approx \exp\left(-N\cdot\alpha\left(\frac{C}{N}\right) - \beta\left(\frac{C}{N}\right)\sqrt{BN}\right).$$

B. Admissible Region

For small values of B it is expected that the number of admissible sources grows rapidly. If $e_{-\delta}$ is the required loss fraction, we have to solve $$N_B\cdot\alpha\left(\frac{C}{N_B}\right) + \beta\left(\frac{C}{N_B}\right)\sqrt{BN_B} = -\delta,$$

where $N_B$ is the Brownian bridge approximation of the number of admissible flows for a given buffer size B. Implicit differentiation with respect to B yields $$\frac{dN}{dB}\left(\frac{c}{N}\alpha' - \alpha + \frac{C\sqrt{B}}{N\sqrt{N}}\beta' - \sqrt{\frac{B}{N}\frac{\beta}{2}}\right) = \sqrt{\frac{N}{B}\frac{\beta}{2}},$$

where ' denotes derivative with respect to the argument $C/N$. This yields $\sqrt{B}\cdot dN/dB \to K/2$ when $B\downarrow 0$, with $$K := \sqrt{N_0}\cdot\beta\left(\frac{C}{N_0}\right)\left(\frac{C}{N_0}\cdot\alpha'\left(\frac{C}{N_0}\right) - \alpha\left(\frac{C}{N_0}\right)\right)^{-1}.$$

Hence, $N_B$ grows quickly for small B, i.e., as $N_0 + K\sqrt{B}$; $N_0$ follows from $N_0\cdot\alpha(C/N_0) = -\delta$ Large Buffers, Homogeneous Traffic This sections deals with an approximation of the loss probability for large values of the buffer size B, and a corresponding expression for the admissible region.

A. Approximation

Let $B(t)$ be Brownian motion with drift $EB(t) = \mu t$ and $VarB(t) = \sigma^2 t$. It can be verified that, for $t\in[0, S]$, $$E(B(t)|B(S) = \mu S) = \mu t, \text{ and}$$

$$Var\left(B(t)|B(S) = \mu S\right) = \sigma^2\frac{t}{S}(S-t),$$

where $(B(t)|B(S) = \mu S)$ denotes the Brownian bridge for $t\in[0, S]$.

Now consider traffic generated by a single stream of a well-known $N\cdot D/D/1$ queue, i.e., a queue fed by N input sources, each of which emits a packet every, say, S units of time. Let $\overline{A}(t)$ be the number of packets generated by such a stream in the interval $[0, t)$. It can be shown that $E\overline{A}(t) = t/S$ and $Var\,\overline{A}(t) = t(S-t)/S^2$. In other words, for $\mu = 1/S$ and $\sigma^2 = 1/S$, the first two moments of $\overline{A}(t)$ and the Brownian bridge coincide. In the central limit regime, i.e., when the load of the queue is relatively high, the mean and variance essentially determine the moment generating function of the input process:

$$\log E[e^{\theta X(t)}] \approx \theta\mu + \frac{1}{2}\theta^2\sigma^2(t) + O(\theta^3).$$

This justifies the use of the Brownian bridge as an approximation of the $N\cdot D/D/1$ queue. The probability distribution of the Brownian bridge is explicitly known in the art.

For deterministic on-off sources, $VarA(t)$ is not proportional to $t(S-t)$, but it does have the property that it drops to 0 at time S. We can therefore choose $\mu$ and $\sigma^2$ of the Brownian bridge to fit the mean and to conservatively bound the variance $VarA(t)$ with a function proportional to $t(S-t)$. The resulting Brownian bridge can then be applied on the corresponding process to get a conservative estimate.

By way of example, we can choose $\mu = rS = pT$. The conservative, i.e., dominating, variance should satisfy $\sigma^2_{BB}(t) \geq \sigma^2(t)$ for all $t\in[0, S]$. If $0\leq T\leq S/2$, this may be done by choosing $\sigma^2_{BB}(t) = \sigma^2 t(S-t)$ where $$\sigma^2 = p^2\left(T^2 - \frac{4T^3}{3S}\right) =: p^2\tau^2,$$

having equality at $t=0$, $S/2$, and T, and strict inequality elsewhere. T should be replaced by $S-T$ in the formula $S/2 < T \leq S$.

Figure 3:
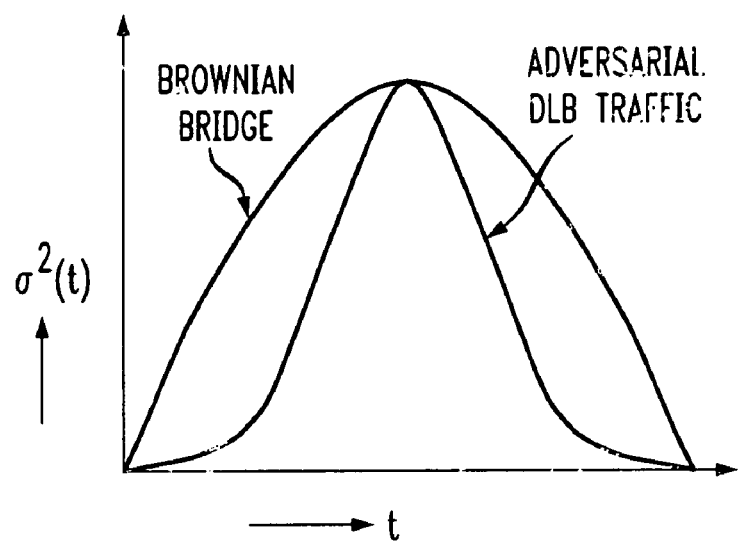
FIG. 3 shows variance plots for deterministic on-off traffic and the closest Brownian bridge fit, in an illustrative embodiment of the invention.

FIG. 3 shows a plot of the above-described example variance for the assumed deterministic on-off, adversarial and DLB regulated traffic, and a corresponding plot of the closest Brownian bridge fit.

Let $B_r(\cdot)$ be a Brownian bridge with parameters $\mu_{BB}(\cdot)$ and $\sigma^2_{BB}(\cdot)$. Because of the conservative choice of $\tau^2$, and by direct application of the overflow probability formula for the Brownian bridge, we obtain the following expression for the loss probability:

$$L(B, C) = P\left\{\exists\, t\epsilon[0, S]: \sum_{i=1}^{N} A_i(t) > B + Ct\right\}$$

$$\approx P\left\{\exists\, t\epsilon[0, S]: \sum_{i=1}^{N} B_i(t) > B + Ct\right\}$$

$$= \exp\left(-\frac{2B}{Np^2\tau^2}(B + CS - NpT)\right).$$

B. Admissible Region

For the N·D/D/1 queue with impulses of size $p\tau$ every S units of time, the Brownian bridge approximation looks like $$\exp\left(-\frac{2B}{Np^2\tau^2}(B + CS - Np\tau)\right).$$

Figure 4:
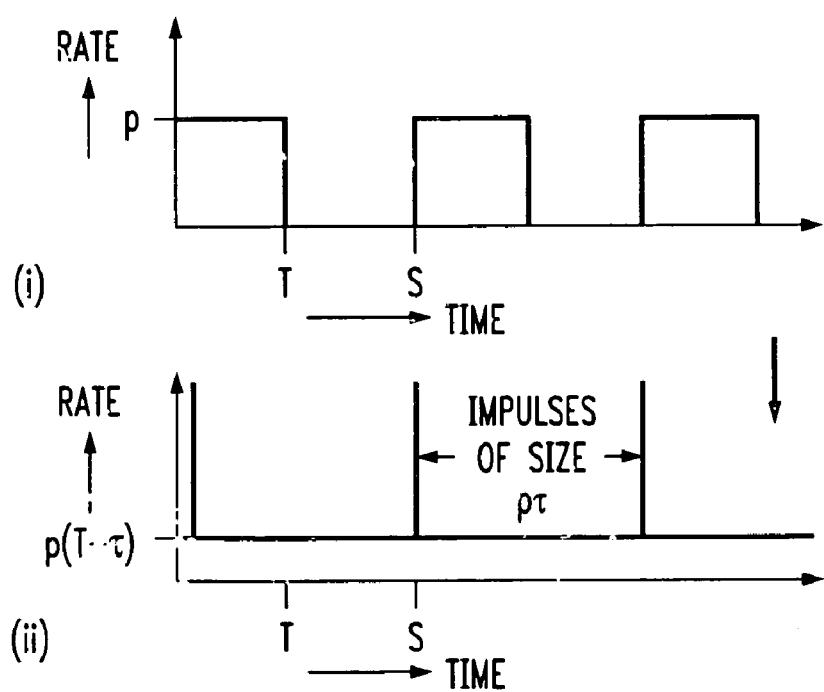
FIG. 4 illustrates the replacement of a single deterministic on-off source with a superposition of constant rate and periodic impulse.
Figure 5A:
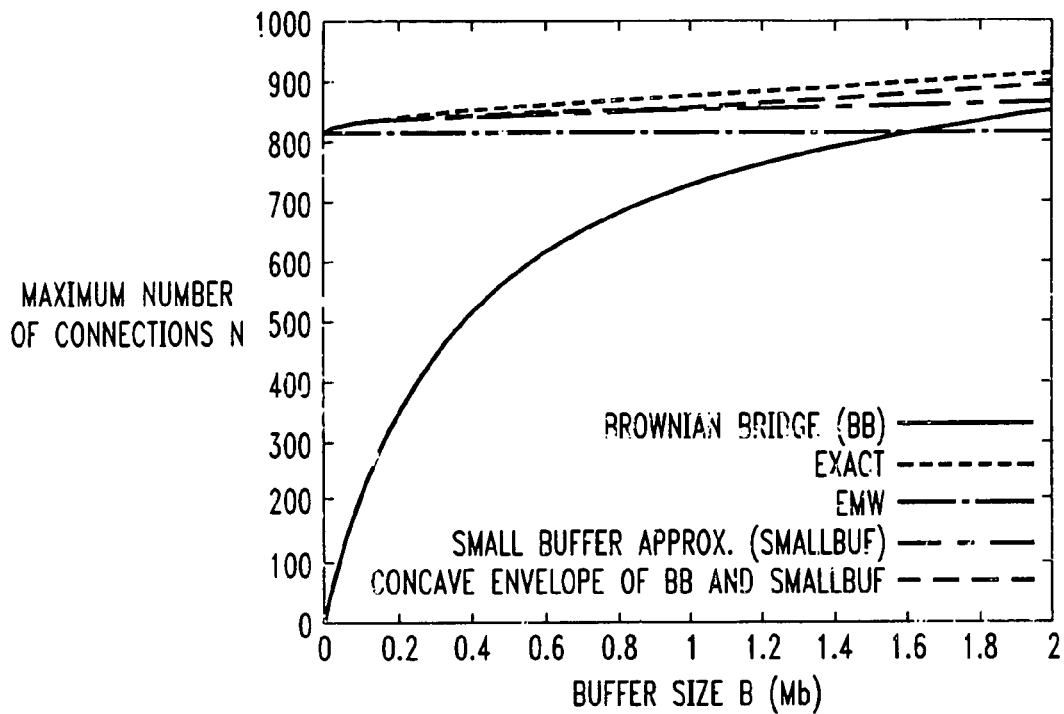
FIGS. 5A, 5B, 5C and 5D show plots of the maximum number of admissible connections N as a function of buffer size B, as determined in accordance with the invention for a number of example sets of homogeneous traffic parameters.
Figure 5B:
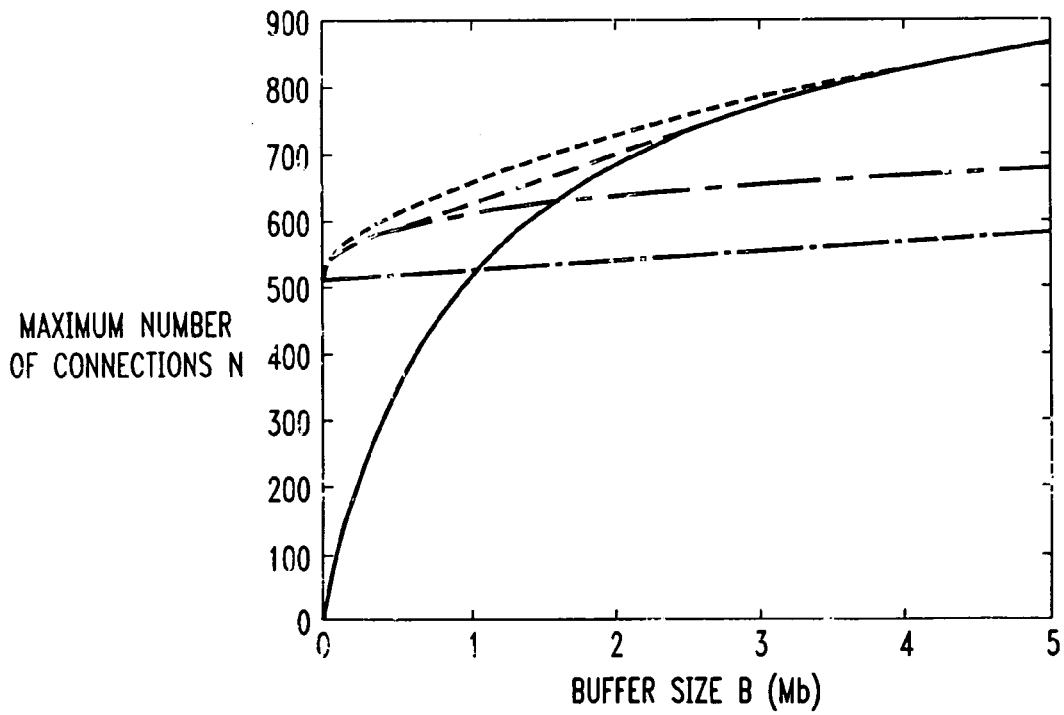
Figure 5C:
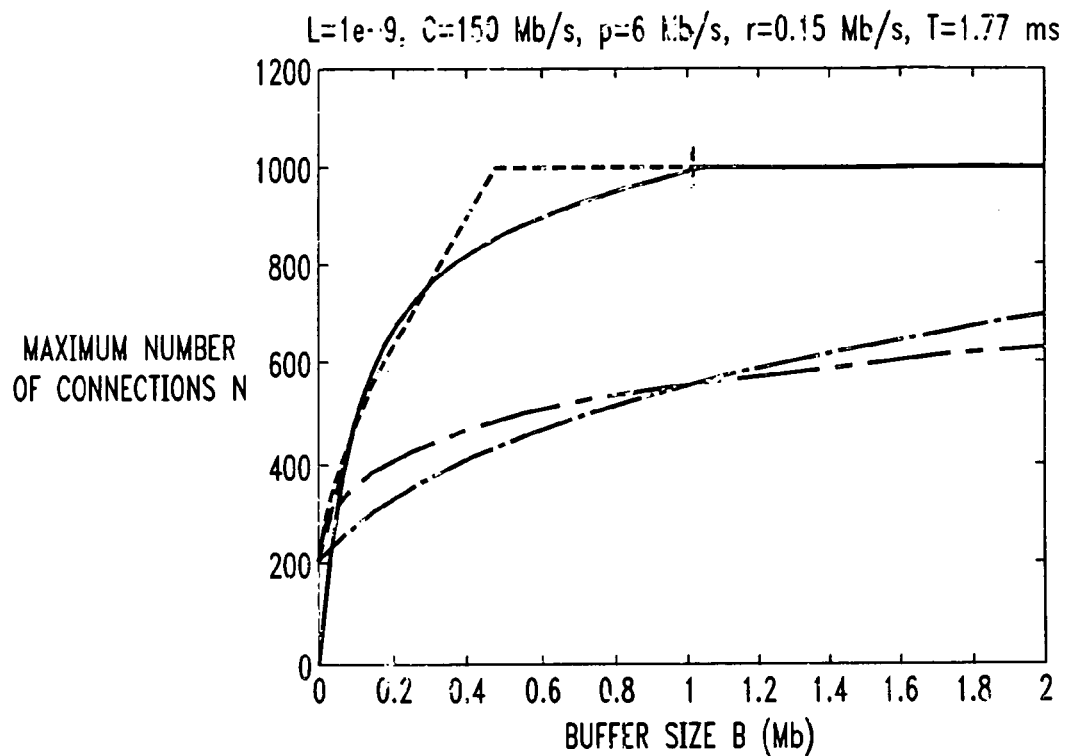
Figure 5D:
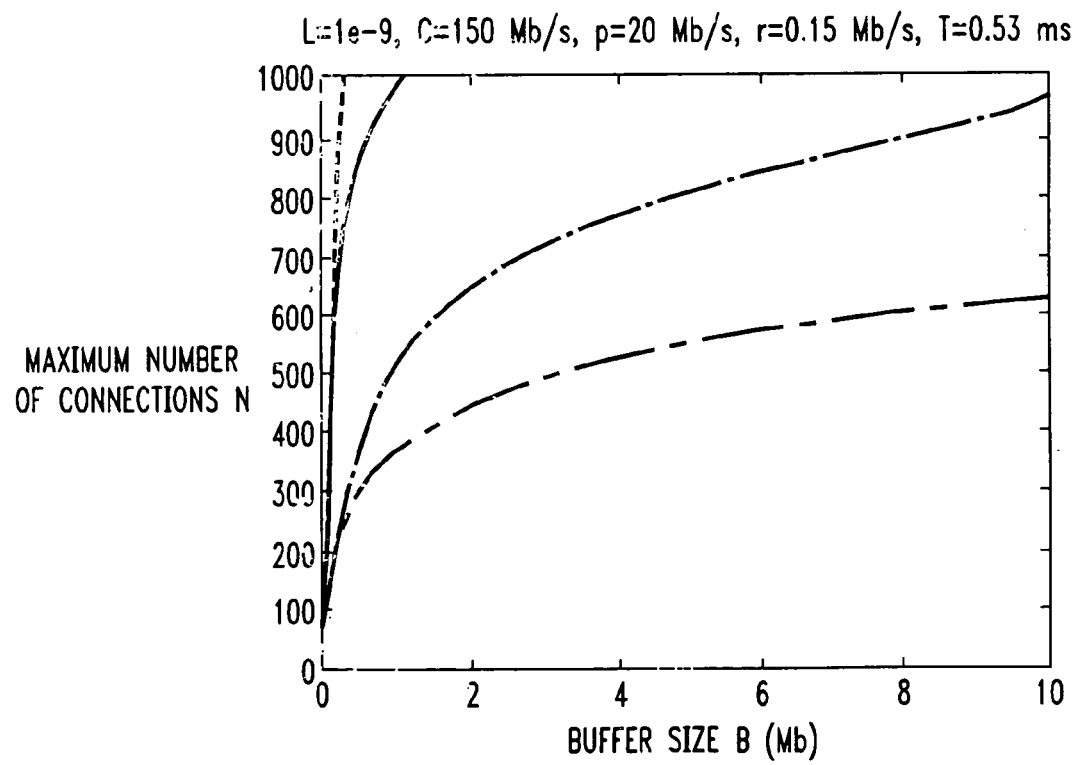

FIG. 4 illustrates an interpretation of this result. More particularly, a single deterministic on-off source having the rate-time plot shown in part (i) of the figure is conservatively replaced by a superposition of a constant rate and periodic impulse function as shown in part (ii) of the figure. The parameter $p\tau$, picked using the tightest variance fit to the Brownian bridge, determines an instantaneous burst that is generated every S units of time, whereas the difference $p(T-\tau)$ arrives at a constant rate. This is a significant improvement over replacing the entire square wave profile with which corresponds to the choice $\tau$–T.

For a given loss probability $L=e^{-\delta}$, we obtain the maximum number of admissible sources $N_B$ as $$N_B = \frac{2B(B + CS)}{p^2\tau^2\delta + 2BpT}.$$

As will be described below, this expression provides improved results relative to conventional techniques for determining the admissible region.

Numerical Examples for Homogeneous Traffic

FIGS. 5A through 5D show plots of the maximum number of connections N as a function of maximum buffer size B for four example homogeneous traffic classes, as determined in accordance with the above-described techniques for homogeneous traffic. The traffic parameters for each of the four classes are shown in Table 1 below.

TABLE 1

| Class | r (Mbps) | p (Mbps) | T (ms) | S (ms) | Loss |
|---|---|---|---|---|---|
| 1 | 0.15 | 0.3 | 353 | 707 | $10^{-9}$ |
| 2 | 0.15 | 1.5 | 70.7 | 707 | $10^{-9}$ |
| 3 | 0.15 | 6.0 | 1.77 | 70.7 | $10^{-9}$ |
| 4 | 0.15 | 20 | 0.53 | 70.7 | $10^{-9}$ |

The link rate or capacity C for each of these examples is assumed to be 150 Mbps. As is apparent from the above table, the classes are arranged in order of increasing burstiness. The plots in FIGS. 5A, 5B, 5C and 5D correspond to the classes 1, 2, 3 and 4, respectively.

Each of these figures includes a number of individual curves, which correspond to (1) the above-described Brownian bridge approximation (BB) for large buffer size, (2) an asymptotically exact but computationally difficult conventional measure (exact), (3) the conventional approach of A. Elwalid, D. Mitra and R. H. Wentworth (EMW) as described in the above-cited U.S. Pat. No. 5,838,663, (4) the above-described approximation for small buffer size (SmallBuf), and (5) a concave envelope of BB and SmallBuf.

The terms "small" and "large" as used herein with regard to buffer size are intended to include without limitation those buffer sizes for which the respective SmallBuf and BB approximations provide a good approximation of the exact measure.

It can be seen that the conventional EMW approach generally performs well for small buffer sizes, but loses its efficiency for larger buffer sizes, as was mentioned previously. The Brownian bridge approximation of the present invention, however, is close to the exact curve for large buffer size, e.g, buffer sizes greater than about 2.5 Mb, as can be seen from FIG. 5B. Notice that there are certain parts of the exact curve, e.g., in FIG. 5C, for which the Brownian bridge approximation is not conservative. Apparently, the conservative bound on the second moment of A(t) is not sufficient in these locations, in that higher moments play an important role (particularly when the load is relatively low such that the above-noted central limit regime does not apply). In general, though, the differences are not very significant between the BB curve and the exact curve, for large buffer sizes. Moreover, it can be seen that the small buffer approximation captures the exact curve quite well for small buffer sizes, e.g., buffer sizes less than about 0.5 Mb, as can be seen from FIG. 5B.

The concave envelope provides a unified approximation. The portion of the SmallBuf curve for small buffer sizes is merged with the portion of the BB curve for large buffer sizes, by joining the two portions with a linear segment such that a concave envelope is formed. It is apparent that the concave envelope curve provides a good fit for all of the example traffic classes, and is nearly always still conservative.

Heterogeneous Traffic

The case of heterogeneous traffic will now be considered. It is assumed that there are multiple classes of regulated sources sharing common resources C and B. The sources are homogeneous within each class, but may differ in traffic parameters, e.g., DLB parameters, across classes. The difference in parameters generally implies that the deterministic on-off profiles for each class may have different period on-times and amplitudes.

In accordance with the invention, we optimally partition (B, C) into ($B_i$, $C_i$) among the classes, given a fixed number $N_i$ of sources in each class. The term "optimal" in this context refers to maximizing the size of the admissible region by maximizing N for a given connection mix vector $$\eta = \{\eta_1, \ldots, \eta_K\} := \left(\frac{N_1}{N}, \ldots, \frac{N_K}{N}\right).$$

Partitioning of resources, which can support diverse QoS requirements by protecting individual classes, generally loses the multiplexing advantage obtained by sharing across classes. However, partitioning is still very efficient in the practical case of small number of classes K, each with large number of connections $N_i >> K \forall i$.

We will initially formulate a general version of the above-noted partitioning problem, followed by a specialized solution for the Brownian bridge. We conclude this section by describing the relevance of the partitions to conventional generalized processing sharing (GPS) and shared buffer management.

A. Solution to the General Problem

Consider the admissible region specified by $$R_i(C_i, B_i, N_i) = \delta_i := -\log L_i$$

for each class i with distinct traffic parameters. For a given $N_i$, $\delta_i$ pair, the above equation defines a convex $B_i$ versus $C_i$ tradeoff curve (i.e., a buffer-bandwidth tradeoff curve, more generally referred to herein as a buffer-capacity tradeoff curve), for the concave envelope introduced in the previous section, as well as for the small and large buffer approximations individually. To find the admissible region we then seek to maximize N subject to $$R_i(C_i, B_i, N\eta_i) \geq \delta_i \, \forall \, i, \, \sum_i C_i \leq C, \text{ and } \sum_i B_i \leq B.$$

At the above-noted optimum, all of the loss constraints in this formulation would hold with equality, as otherwise it would be possible to reduce $B_i$ and/or $C_i$ for the corresponding class and thereby admit more connections. The fact that N needs to be integral may be ignored for simplicity, since this is of minor consequence when N>>1. For fixed N, in particular the optimal value, the buffer size B can be determined as a function of the other parameters, i.e., $B_i = B_i(C_i, N\eta_i, \delta_i)$. Now consider the intermediate problem:

$$\text{Minimize } \sum_i B_i(C_i, N\eta_i, \delta_i) \text{ subject to } \sum_i C_i \leq C.$$

This is a standard convex minimization to which well-known Strong-Lagrangian principles can be applied, which yields the following Kuhn-Tucker conditions:

$$-\frac{\partial B_i}{\partial C_i} = \frac{\partial R_i / \partial C_i}{\partial R_i / \partial B_i} = \lambda$$

for some global (class-dependent) non-negative Lagrange multiplier $\lambda$. It follows that the maximum value of N retains feasibility of the following conditions for some $\lambda$, which represents the slope of each of the $B_i$ versus $C_i$ tradeoff curves at the optimal operating point:

$$R_i(C_i, B_i, N\eta_i) = \delta_i$$

$$-\frac{\partial B_i}{\partial C_i} = \frac{\partial R_i / \partial C_i}{\partial R_i / \partial B_i} = \lambda$$

$$\sum_i C_i \leq C, \quad \sum_i B_i \leq B.$$

Figure 6A:
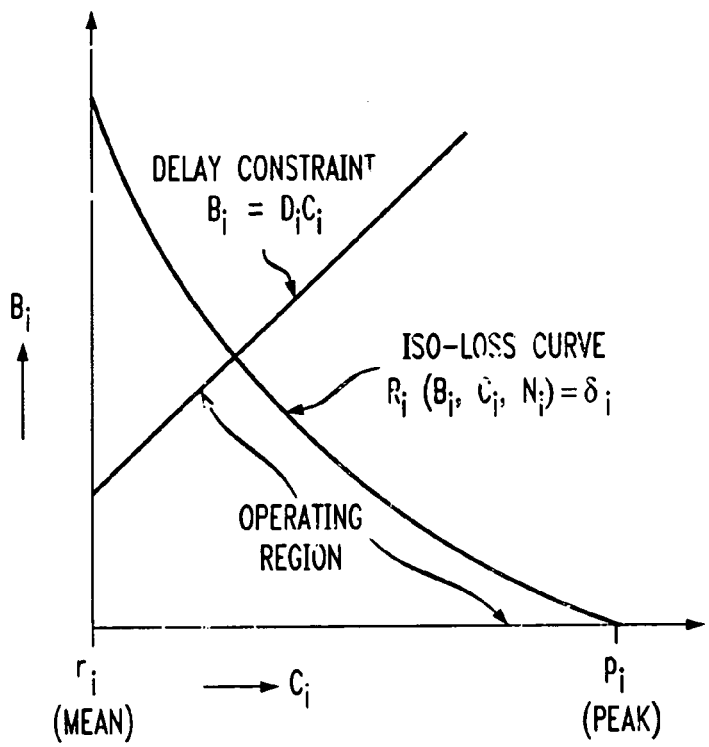
FIGS. 6A and 6B are plots illustrating the optimal tradeoff between buffer size B and link capacity C in an illustrative embodiment of the invention.
Figure 6B:
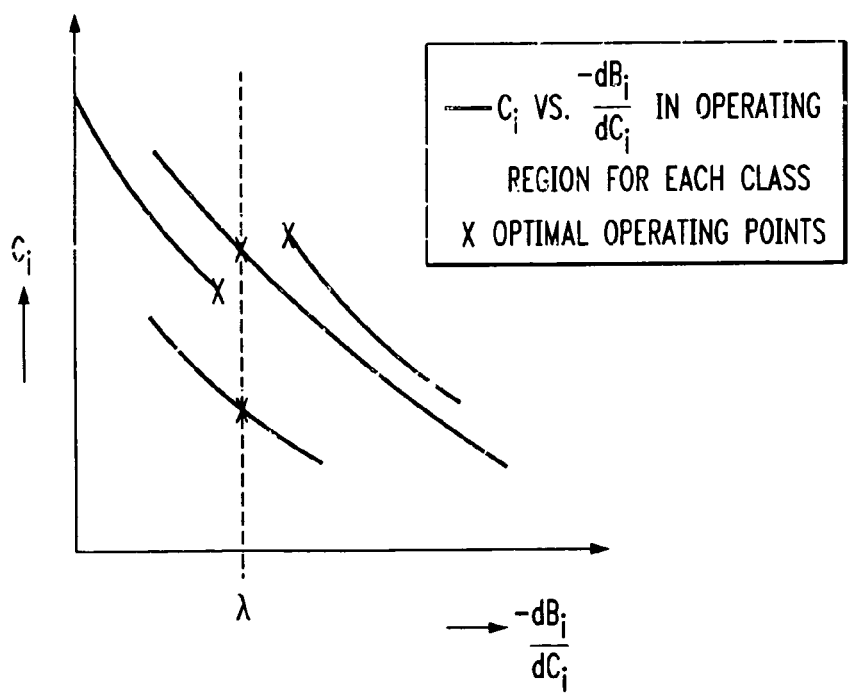

FIGS. 6A and 6B illustrate the solution to the above optimization problem. FIG. 6A shows an iso-loss buffer-capacity tradeoff curve corresponding to the above equation $R_i(C_i, B_i, N_i) = \delta_i$ specifying the admissible region for class i. The tradeoff curve is plotted as $B_i$ versus $C_i$, and in conjunction with the plotted delay constraint $B_i = D_i C_i$ defines an operating region as shown. The tradeoff curve intersects the $B_i$ axis at the maximum average or mean rate $r_i$, and intersects the $C_i$ axis at the peak rate $p_i$. FIG. 6B illustrates the optimal operating points within the operating region as determined by the intersection of the $C_i$ versus $-dB_i/dC_i$ curves with the multiplier $\lambda$.

As indicated above, the operating region in FIG. 6A is defined in part by a per-class delay constraint of the form $B_i < D_i C_i$. Other jointly semi-concave constraints of the form $f(B_i, C_i) \geq 0$ could be used, without altering the solution procedure significantly. When the $\lambda$ condition above cannot be satisfied for all classes, which may happen when $$\max -\frac{\partial B_i}{\partial C_i} < \lambda \text{ or } \min -\frac{\partial B_i}{\partial C_i} > \lambda$$

within the operating region for some i, as occurs for two of the curves in FIG. 6B, we may replace $\lambda$ by the closest achieved value for class i, and choose the corresponding operating point ($B_i$, $C_i$) on the tradeoff curve. This implies that the optimal operating point for this class corresponds to either the mean rate (or the maximum delay limit when delay constrained) or the peak rate. The optimal operating point for each class i is therefore uniquely specified for given $\lambda$ when the equation $R_i(C_i, B_i, N_i) = \delta_i$ defining the admissible region satisfies the above-described convexity property for each class.

The multiclass problem has thus been reduced to a two variable optimization on N, $\lambda$, which can be solved using a simple bisection search procedure on $\lambda$ for fixed N followed by an outer bisection on N. This general procedure is used to obtain the admissible region for the concave fit, but further simplification is possible if the Brownian bridge approximation is adequate, as will be described below.

The general procedure is applicable to all traffic types with convex tradeoff curves, of which leaky bucket regulated traffic is just an example. In fact, the procedure holds for all traffic types, since the tradeoff curve has been shown to be convex for all traffic types, as is described in the above-cited U.S. Provisional Application No. 60/244,956, and in an article by K. Kumaran and M. Mandjes, "The buffer-bandwidth trade-off curve is convex," Queueing Systems, Vol. 38, No. 4, August 2001, pp. 471–483, which is incorporated by reference herein.

Thus, it can be shown that the above-noted convexity holds under more general circumstances, motivated by the supposition of "diminishing returns" in buffer-capacity tradeoffs. This refers to the intuitive observation that, for a fixed number of connections and specified performance target, one obtains diminishing savings in bandwidth as buffer space is increased, and vice versa. Note that the tradeoff curves could be obtained by measurements when traffic characteristics are not available explicitly.

The above techniques can also be utilized to provide a control algorithm to achieve the optimal operating point without explicitly computing the admissible region. The per-class ($B_i$, $C_i$) tradeoff curves, along with measurements of buffer and bandwidth utilizations, are the main drivers of this control. By way of example, the following simple proportional control converges at the unique optimal value of $\lambda$, which necessarily exists if the problem is at all feasible:

Reduce (Increase)$\lambda$, if the buffer utilization is higher (lower) than the bandwidth utilization, by an amount proportional to the absolute difference in the utilizations. Reducing $\lambda$ would decrease the $B_i$ and increase $C_i$ for every class, while increasing $\lambda$ does the opposite. Hence the above proportional control algorithm efficiently reallocates resources to achieve balanced buffer and bandwidth usage overall.

It should be noted that the above-described partitioning solution neglects possible inter-class sharing of resources, which could lead to significant inefficiency when the number of classes is large. Alternative embodiments of the invention could be configured to take such inter-class sharing or resources into account.

B. Brownian Bridge

Applying the above-described partitioning technique to this special case, we seek to maximize N subject to $$\frac{2B_i}{N\eta_i p_i^2 \tau_i^2}(B_i + C_i S_i - p_i N \eta_i T_i) \geq \delta_i \forall\, i, \sum_i C_i \leq C, \text{ and } \sum_i B_i \leq B.$$

It can be shown that the necessary convexity conditions hold here, and that these equations can be solved nearly in closed form, except for numerically solving for $\lambda$ in $$Cf(\lambda) - Bg(\lambda) = \frac{\alpha}{f(\lambda)} B^2,$$

where the optimum value for N is given by $$N = \frac{B}{f(\lambda)}$$

for $\lambda$ satisfying this equation, and where $$f(\lambda) = \sum_i \sqrt{\frac{\eta_i p_i^2 \tau_i^2 \delta_i}{2}} \sqrt{\frac{\lambda}{S_i - \lambda}}$$

$$g(\lambda) = \sum_i \frac{1}{S_i} \sqrt{\frac{\eta_i p_i^2 \tau_i^2 \delta_i}{2}} \frac{S_i - 2\lambda}{\sqrt{\lambda(S_i - \lambda)}}.$$

$$\alpha = \sum_i \frac{\eta_i T_i P_i}{S_i}$$

C. Relation to GPS and Buffer Management

The optimal partitioning results described above may be used to set GPS weights and to perform buffer management in an integrated fashion. More particularly, given the optimal ($B_i$, $C_i$) split, the GPS weight $\Phi_i$ for each class i connection (assuming per connection queuing) can be set as $\phi_i = C_i/(N_i C)$. If the queuing is per-class, the weights would be $\Phi_i = C_i/C$ for class i. However to guarantee QoS requirements, the corresponding buffer space generally must be guaranteed as well. This can be accomplished using the well-known conventional technique of virtual partitioning, for which the per-class nominal allocations are given by $$b_i = \frac{B_i}{N_i}$$

from the optimal partition. The techniques of the invention can thus be used to integrate GPS, buffer management and admission control in a heterogeneous traffic setting, which has previously proved a challenge.

Numerical Examples for Heterogeneous Traffic

Figure 7A:
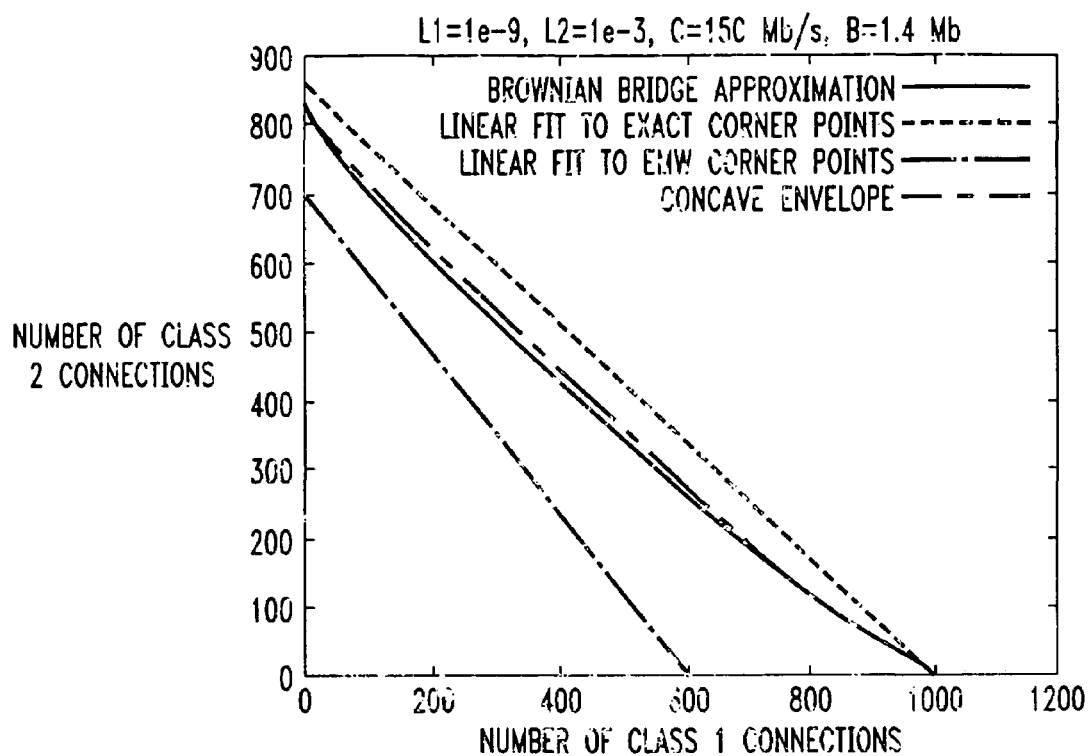
FIGS. 7A and 7B show plots two-class heterogeneous traffic admissible regions for different buffer sizes B, as determined in accordance with the invention.
Figure 7B:
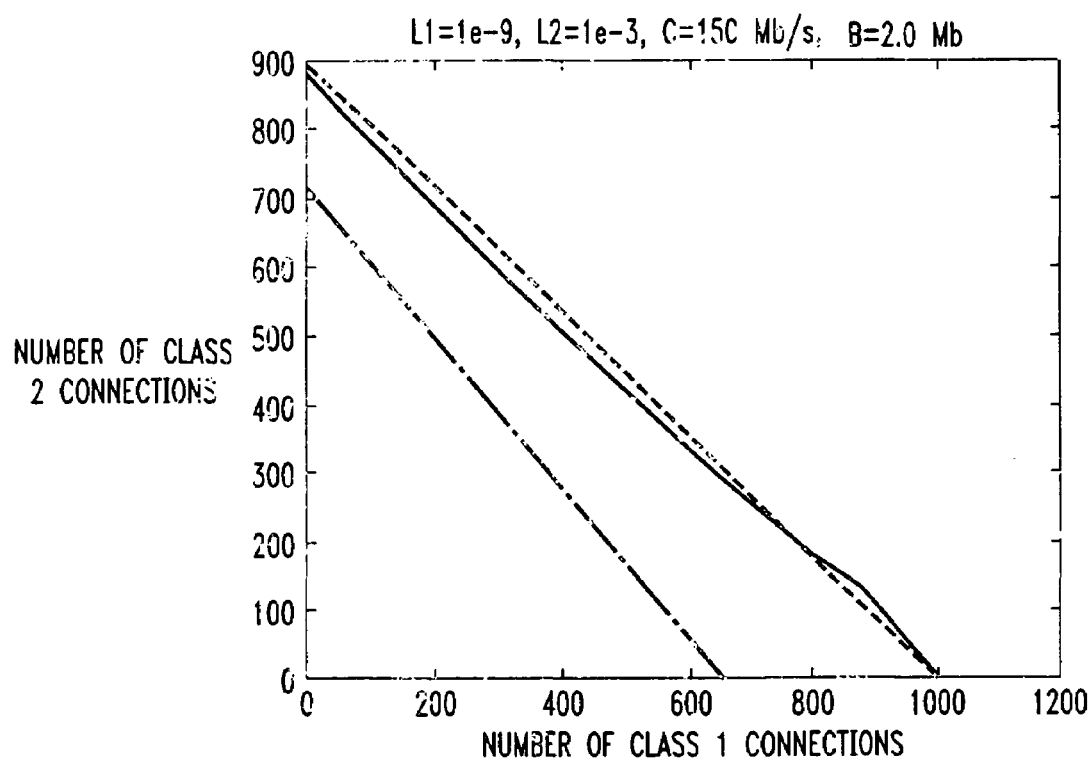

FIGS. 7A and 7B are plots of admissible regions for two-class heterogeneous traffic, as determined using the above-described optimal resource partitioning procedure. The traffic parameters for the class 1 and class 2 traffic of FIGS. 7A and 7 are those of classes 2 and 3, respectively, of Table 1 above, such that the loss requirements are selected as $10^{-9}$ and $10^{-3}$ respectively.

Each of these figures includes a number of individual curves, which correspond to (1) the above-described Brownian bridge approximation, (2) a first bounding line formed by linear fit to corner points of the "exact" approach referred to in conjunction with FIGS. 5A–5D, (3) a second bounding line formed by linear fit to corner points of the EMW approach referred to in conjunction with FIGS. 5A–5D, and (4) the above-described concave envelope approximation.

It is apparent from the figures that the Brownian bridge and concave envelope approximations of the present invention improve on the EMW approach. These approximations also generally correspond well to the results for the exact approach, while being computationally much simpler. The discrepancy between the exact and concave envelope curves in FIG. 7A is mainly due to the fact that the buffer space assumed is not yet "large" for the class 2 connections, as seen by the improved fit in FIG. 7B with a larger buffer. In particular, the Brownian bridge approximation is very fast and reasonably accurate when the cumulative buffer space is large and the delay constraint for individual classes is not too stringent. There is also close agreement between the concave fit and Brownian bridge approximations in terms of the optimal operating points ($B_i$, $C_i$). It should be noted, however, that in the intermediate buffer range, the concave fit approximation differs significantly from the exact results.

The present invention in the illustrative embodiment described herein provides improved approximations for controlling traffic from homogeneous regulated sources. As was described above, these approximations also provide the basis for techniques to optimally partition resources among heterogeneous classes in accordance with the invention. Advantageously, the techniques of the invention are fast, accurate, and simple.

The techniques of the invention are suitable for use in a wide variety of communication network applications, including wireless networks, high-speed multimedia networks, Internet Protocol (IP) networks, etc.

As indicated previously, the above-described embodiments of the invention are intended to be illustrative only. For example, the invention can be implemented in a wide variety of different data processing devices, using software, hardware or combinations of software and hardware. In addition, the admission region approximations and buffer-capacity tradeoff curve optimizations described herein in conjunction with the illustrative embodiments may be varied to accommodate the particular requirements of a given application. Moreover, the invention may be used in conjunction with many different types of QoS guarantees other than those specifically described herein. These and numerous other alternative embodiments may be devised by those skilled in the art without departing from the scope of the following claims.

What is claimed is:

1. A processor-implemented method for controlling the transmission of packets over a communication link in a network, the method comprising the steps of:
   determining a number of packet transmission connections supportable for a given buffer size in a node of the network while maintaining one or more specified quality of service requirements for packet transmission; and
   processing data packets from multiple input sources in the node of the network based at least in part on the determined number of supportable connections;
   wherein the multiple input sources comprise homogeneous sources;
   wherein the determining step comprises determining at least a portion of a loss curve specifying a decay rate of packet loss probability as a function of buffer size allocated to a given one of the homogeneous sources, the loss curve being determined utilizing a first approximation for a first portion of the curve corresponding to a relatively small buffer size and a second approximation for a second portion of the curve corresponding to a relatively large buffer size; and
   wherein the first approximation comprises a square root approximation configured to reflect positive correlations between the homogeneous sources.

2. The method of claim 1 further including the step of determining an operating point for the network node on a tradeoff curve which specifies the variation in the buffer size as a function of the capacity of a link over which the packet transmission connections are made, the operating point designating the given buffer size and corresponding capacity for a particular number of connections.

3. The method of claim 1 wherein the determining step includes modeling the multiple input sources as deterministic on-off sources subject to dual leaky bucket regulation, such that a given source has associated therewith a peak rate p, a mean rate r and a maximum burst period T.

4. The method of claim 1 wherein the homogeneous sources each have the same peak rate p, mean rate r and maximum burst period T.

5. The method of claim 1 wherein the multiple sources comprise heterogeneous sources of different types i, i=1, 2, ... K, wherein a given source of type i has peak rate $p_i$, mean rate r1, and maximum burst period $T_i$ and $N_i$ denotes the number of sources of type i, and further wherein the maximum number of supportable connections is given by N, where $$N = \sum_{i=1}^{K} N_i.$$

6. The method of claim 1 wherein the determining step includes the determining at least one of a probability of actual buffer content exceeding a maximum buffer size and a probability of a packet delay exceeding a specified amount.

7. The method of claim 1 wherein the first approximation is given by:

$$L(B, C) \approx \exp\left(-N \cdot \alpha\left(\frac{C}{N}\right) - \beta\left(\frac{C}{N}\right)\sqrt{BN}\right),$$

where L denotes the packet loss probability, B denotes the buffer size, C denotes the capacity of the communication link, α and β denote constants, and N denotes the maximum number of supportable connections.

8. A processor-implemented method for controlling the transmission of packets over a communication link in a network, the method comprising the steps of:
   determining a number of packet transmission connections supportable for a given buffer size in a node of the network while maintaining one or more specified quality of service requirements for packet transmission; and
   processing data packets from multiple input sources in the node of the network based at least in part on the determined number of supportable connections;
   wherein the multiple input sources comprise homogeneous sources;
   wherein the determining step comprises determining at least a portion of a loss curve specifying a decay rate of packet loss probability as a function of buffer size allocated to a given one of the homogeneous sources, the loss curve being determined utilizing a first approximation for a first portion of the curve corresponding to a relatively small buffer size and a second approximation for a second portion of the curve corresponding to a relatively large buffer size; and
   wherein the second approximation comprises a Brownian bridge approximation configured to reflect negative correlations between the multiple sources.

9. The method of claim 8 wherein the second approximation is given by:

$$L(B, C) \approx \exp\left(-\frac{2B}{Np^2\tau^2}(B + CS - NpT)\right),$$

where L denotes the packet loss probability, B denotes the buffer size, C denotes the capacity of the communication link, p denotes peak rate, S and T denote time parameters, τ denotes a Brownian bridge parameter, and N denotes the maximum number of supportable connections.

10. A processor-implemented method for controlling the transmission of packets over a communication link in a network, the method comprising the steps of:
   determining a number of packet transmission connections supportable for a given buffer size in a node of the network while maintaining one or more specified quality of service requirements for packet transmission; and
   processing data packets from multiple input sources in the node of the network based at least in part on the determined number of supportable connections;
   wherein the multiple input sources comprise homogeneous sources;
   wherein the determining step comprises determining at least a portion of a loss curve specifying a decay rate of packet loss probability as a function of buffer size allocated to a given one of the homogeneous sources, the loss curve being determined utilizing a first approximation for a first portion of the curve corresponding to a relatively small buffer size and a second approximation for a second portion of the curve corresponding to a relatively large buffer size; and wherein the loss curve is determined as a concave curve combination of curves corresponding to the first and second approximations.

11. The method of claim 5 further including the step of partitioning a buffer size B and link capacity C into ($B_i$, $C_i$) for the i different types of sources in conjunction with maximizing N for a given connection mix vector.

12. The method of claim 11 further including the step of determining an admissible region specified by:

$$R_i(C_i,B_i,N_i) = \delta_i := -\log L_i$$

for an ith type of source, where $R_i$ denotes the region for the ith type of source and $L_i$ denotes the packet loss probability for the ith type of source, so as to define a convex $B_i$ versus $C_i$ tradeoff curve for that type of source.

13. A processor-implemented method for controlling the transmission of packets over a communication link in a network, the method comprising the steps of:

determining a number of packet transmission connections supportable for a given buffer size in a node of the network while maintaining one or more specified quality of service requirements for packet transmission; and processing data packets from multiple input sources in the node of the network based at least in part on the determined number of supportable connections;

wherein the multiple sources comprise heterogeneous sources of different types i, i=1, 2, ... K, wherein a given source of type i has peak rate $p_i$, mean rate $r_i$, and maximum burst period $T_i$, and $N_i$ denotes the number of sources of type i, and further wherein the maximum number of supportable connections is given by N, where $$N = \sum_{i=1}^{K} N_i;$$

wherein a buffer size B and link capacity C are partitioned into ($B_i$, $C_i$) for the i different types of sources in conjunction with maximizing N for a given connection mix vector; and wherein N is maximized subject to:

$$R_i(C_i, B_i, N\eta_i) \geq \delta_i \forall i, \sum_i C_i \leq C, \text{ and } \sum_i B_i \leq B.$$

14. A processor-implemented method for controlling the transmission of packets over a communication link in a network, the method comprising the steps of:

determining a number of packet transmission connections supportable for a given buffer size in a node of the network while maintaining one or more specified quality of service requirements for packet transmission; and processing data packets from multiple input sources in the node of the network based at least in part on the determined number of supportable connections;

wherein the multiple sources comprise heterogeneous sources of different types i, i=1, 2, ... K, wherein a given source of type i has peak rate $p_i$, mean rate $r_i$, and maximum burst period $T_i$, and $N_i$ denotes the number of sources of type i, and further wherein the maximum number of supportable connections is given by N, where $$N = \sum_{i=1}^{K} N_i;$$

wherein a buffer size B and link capacity C are partitioned into ($B_i$, $C_i$) for the i different types of sources in conjunction with maximizing N for a given connection mix vector;

wherein an admissible region is determined, the admissible region specified by:

$$R_i(C_i,B_i,N_i) = \delta_i := -\log L_i$$

for an ith type of source, where $R_i$ denotes the region for the ith type of source and $L_i$ denotes the packet loss probability for the ith type of source, so as to define a convex $B_i$ versus $C_i$ tradeoff curve for that type of source; and wherein an optimal operating point for the node on a given one of the convex $B_i$ versus $C_i$ tradeoff curves is given by one of:

$$-\frac{\partial B_i}{\partial C_i} = \frac{\partial R_i/\partial C_i}{\partial R_i/\partial B_i} = \lambda$$

and a corresponding closest achieved value for traffic type i, where $\lambda$ denotes a non-negative Lagrange multiplier.

15. The method of claim 14 wherein the optimal operating point is determined in accordance with a proportional control algorithm.

16. The method of claim 15 wherein the proportional control algorithm reduces $\lambda$ if an actual buffer utilization is higher than an actual bandwidth utilization, by an amount proportional to the absolute difference in the utilizations, and increases $\lambda$ if an actual buffer utilization is lower than an actual bandwidth utilization, also by an amount proportional to the absolute difference in the utilizations, such that the proportional control algorithm converges at the optimal operating point without determination of an admissible region.

17. An apparatus for use in controlling the transmission of packets over a communication link in a network, the apparatus comprising:

a memory for implementing at least a portion of a buffer for a node of the network; and a processor associated with the memory and operative to control the transmission of the packets in accordance with the method of claim 1.

18. A computer-readeable medium storing one or more software programs for use in controlling the transmission of packets over a communication link in a network, wherein the one or more programs when executed by a processor implement the method of claim 1.

* * * * *

UNITED STATES PATENT AND TRADEMARK OFFICE
CERTIFICATE OF CORRECTION

PATENT NO. : 7,136,352 B2
APPLICATION NO. : 09/999302
DATED : November 14, 2006
INVENTOR(S) : K. Kumaran et al.

It is certified that error appears in the above-identified patent and that said Letters Patent is hereby corrected as shown below:

Col. 5, line 60, please delete " 1. " and insert -- 1. $t<T$.--.

Col. 5, line 64, please delete " $t<T$ " and the dot following " $t<T$ ".

Col. 6, line 3, please delete " 2. " and insert -- 2. $T \leq t < T'$. --.

Col. 6, line 6, please delete " $T \leq t < T'$ " and the dot following " $T \leq t < T'$ ".

Col. 6, line 10, pelase delete " 3. " and insert -- 3. $t \geq T'$. --.

Col. 6, line 14, please delete " $t \geq T'$ " and the dot following " $t \geq T'$ ".

Col. 7, line 30, please delete " $e_{-\delta}$ " and insert -- $e^{-\delta}$--.

Col. 7, line 43, please delete " $\sqrt{\dfrac{B}{N}\dfrac{\beta}{2}} = \sqrt{\dfrac{N}{B}\dfrac{\beta}{2}}$ " and insert -- $\sqrt{\dfrac{B}{N}}\dfrac{\beta}{2} = \sqrt{\dfrac{N}{B}}\dfrac{\beta}{2}$ --.

Col. 8, line 27, please delete " $\theta\mu$ " and insert -- $\theta\mu t$ --.

Claim 5, col. 15, line 57, please delete "r1" and insert -- $r_i$ --.

Claim 12, col. 17, line 16, please delete " $\delta$: " and insert -- $\delta_i$ : --.

Signed and Sealed this

Ninth Day of January, 2007

JON W. DUDAS
*Director of the United States Patent and Trademark Office*